(12) United States Patent
Park et al.

(10) Patent No.: US 9,868,468 B1
(45) Date of Patent: Jan. 16, 2018

(54) VEHICLE FRONT STRUCTURE FOR LATERAL DEFLECTION DURING NARROW OFFSET IMPACT

(71) Applicants: Sae U Park, Troy, MI (US); Brian M Beaudet, Birmingham, MI (US)

(72) Inventors: Sae U Park, Troy, MI (US); Brian M Beaudet, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/452,870

(22) Filed: Mar. 8, 2017

(51) Int. Cl.
 *B62D 21/15* (2006.01)
 *B62D 25/08* (2006.01)
 *B62D 27/02* (2006.01)
 *B62D 21/02* (2006.01)
 *B60R 19/18* (2006.01)
 *B60R 19/34* (2006.01)

(52) U.S. Cl.
 CPC ......... *B62D 21/152* (2013.01); *B60R 19/18* (2013.01); *B60R 19/34* (2013.01); *B62D 21/02* (2013.01); *B62D 25/085* (2013.01); *B62D 27/02* (2013.01); *B60Y 2400/87* (2013.01)

(58) Field of Classification Search
 CPC ...... B62D 21/152; B62D 21/11; B62D 21/12; B62D 21/02; B60R 19/18
 USPC .................................................. 280/124.109
 See application file for complete search history.

(56) References Cited

U.S. PATENT DOCUMENTS

| | | |
|---|---|---|
| 3,499,661 A | 3/1970 | Rowe, Jr. |
| 3,840,259 A | 10/1974 | Barényi |
| 5,118,160 A | 6/1992 | Kitagawa et al. |
| 5,533,780 A | 7/1996 | Larson et al. |
| 5,685,599 A | 11/1997 | Kitagawa |
| 6,367,868 B1 * | 4/2002 | Larsson ............... B62D 21/152 296/187.03 |
| 6,406,088 B1 | 6/2002 | Tate |
| 6,460,889 B2 | 10/2002 | Iyanagi et al. |
| 6,588,830 B1 | 7/2003 | Schmidt et al. |
| 6,655,728 B2 | 12/2003 | Sano et al. |
| 6,761,242 B2 | 7/2004 | Yoshida et al. |
| 6,811,211 B2 | 11/2004 | Saito |
| 6,866,115 B2 | 3/2005 | Miyasaka |
| 6,899,195 B2 | 5/2005 | Miyasaka |
| 6,938,948 B1 | 9/2005 | Cornell et al. |

(Continued)

FOREIGN PATENT DOCUMENTS

| | | |
|---|---|---|
| CN | 103600773 A | 2/2014 |
| EP | 1177968 A2 | 6/2002 |
| WO | 2013017758 A1 | 7/2013 |

*Primary Examiner* — Faye M Fleming (74) *Attorney, Agent, or Firm* — Ralph E Smith (57) ABSTRACT

A vehicle front structure includes a left side rail that extends longitudinally in a front left portion of the vehicle. The left side rail includes an inboard shell and an outboard shell. A forward section of the outboard shell is at least partially disposed in an outer left quarter of a total width of the vehicle. A rearward section of the outboard shell is disposed inboard of the outer left quarter. The forward sections of the inboard and outboard shells each have a distal side, top side, and bottom side that respectively form generally U-shaped cross-sections. The outboard shell is fixedly attached to the inboard shell to form a generally rectangular cross-section. The forward section of the outboard shell is a first lateral width. The rearward section of the outboard shell is a second lateral width that is less than the first lateral width.

15 Claims, 5 Drawing Sheets

(56) References Cited

U.S. PATENT DOCUMENTS

| | | |
|---|---|---|
| 6,957,846 B2 | 10/2005 | Saeki |
| 7,407,192 B2 | 8/2008 | Yoshimura |
| 7,641,236 B2 | 1/2010 | Yasuhara et al. |
| 7,699,346 B2 | 4/2010 | Wehner et al. |
| 7,819,218 B2 | 10/2010 | Eichberger et al. |
| 7,850,228 B2 | 12/2010 | Asai |
| 8,118,349 B2 * | 2/2012 | Kihara ................ B62D 21/152 |
| | | 296/187.09 |
| 8,276,955 B2 | 10/2012 | Baccouche et al. |
| 8,596,711 B2 | 12/2013 | Yasui et al. |
| 8,684,451 B1 | 4/2014 | Park et al. |
| 8,764,096 B2 | 7/2014 | Han et al. |
| 9,004,576 B2 | 4/2015 | Sakakibara et al. |
| 9,308,940 B1 | 4/2016 | Malavalli et al. |
| 9,676,417 B2 * | 6/2017 | Yamada ................ B60R 19/24 |
| 2008/0007088 A1 | 1/2008 | Newport |
| 2008/0224502 A1 | 9/2008 | Miki |
| 2011/0015902 A1 | 1/2011 | Cheng et al. |
| 2016/0121932 A1 * | 5/2016 | Suzuki ................ B62D 21/152 |
| | | 296/187.09 |
| 2017/0088180 A1 * | 3/2017 | Takeda ................ B62D 21/152 |
| 2017/0113723 A1 * | 4/2017 | Murata ................ B62D 21/152 |

\* cited by examiner

VEHICLE FRONT STRUCTURE FOR LATERAL DEFLECTION DURING NARROW OFFSET IMPACT

FIELD

The present disclosure relates to a vehicle having a front structure for lateral deflection during a narrow offset impact.

BACKGROUND

This section provides background information related to the present disclosure which is not necessarily prior art.

Vehicles conventionally have an internal body structure including a pair of side rails extending longitudinally along on opposite sides of the vehicle's power plant (e.g. engine) in the front of the vehicle. A bumper typically extends laterally along the front of the vehicle, between the two rails. The rails typically support the power plant and any number of vehicle components or body panels. The bumper and rails are conventionally designed to absorb some of the forces that can occur during an impact event by deforming. The degree and location of such deformation can determine the trajectory of the vehicle during and after the impact event, and can influence the forces experienced by vehicle occupants. One type of impact event is known as a narrow offset impact where only the outer 25% of the vehicle's width is impacted by a rigid body during the impact event. Typically, the side rails are located laterally inboard of the outer 25% of the vehicle's width, such that the rigid body of the narrow offset impact event can miss the side rail. This can lead to less desirable energy absorption during narrow offset impact events.

SUMMARY

This section provides a general summary of the disclosure, and is not a comprehensive disclosure of its full scope or all of its features.

In accordance with an aspect of the present disclosure, a front structure of a vehicle includes a left side rail that extends longitudinally in a front portion of the vehicle on a left side of an engine/transmission assembly of the vehicle. The left side rail includes an inboard shell and an outboard shell. A forward section of the outboard shell is at least partially disposed in an outer left quarter of a total width of the vehicle. A rearward section of the outboard shell is disposed inboard of the outer left quarter. The inboard shell has a distal side, a top side, and a bottom side that form a generally U-shaped cross-section. The forward section of the outboard shell has a distal side, a top side, and a bottom side that form a generally U-shaped cross-section. The outboard shell is fixedly attached to the inboard shell to form a generally rectangular cross-section. The forward section of the outboard shell is a first lateral width. The rearward section of the outboard shell is a second lateral width that is less than the first lateral width.

In accordance with an aspect of the present disclosure, the forward section of the outboard shell includes a plurality of outer indentions that extend vertically along the distal side of the outboard shell. The forward section of the inboard shell includes a plurality of inner indentions that extend vertically along the distal side of the inboard shell to facilitate axial deformation of the left side rail.

In accordance with an aspect of the present disclosure, the plurality of outer indentions in the distal side of the outboard shell includes three indentions.

In accordance with an aspect of the present disclosure, the plurality of outer indentions in the distal side of the inboard shell includes two indentions.

In accordance with an aspect of the present disclosure, the front structure includes a crush can fixedly coupled to a forward terminal end of the left side rail and extending axially forward of the terminal end.

In accordance with an aspect of the present disclosure, the front structure includes a blocker body. The blocker body is a rigid body disposed between the left side rail and the engine/transmission assembly of the vehicle. The blocker body is forward of the rearward section and configured to engage the forward section and the engine/transmission assembly to transfer lateral impact forces from the forward section to the engine/transmission assembly during a narrow offset impact event.

In accordance with an aspect of the present disclosure, the blocker body is an alternator fixedly mounted to the engine/transmission assembly.

In accordance with an aspect of the present disclosure, the blocker body is fixedly mounted to the left side rail.

In accordance with an aspect of the present disclosure, the blocker body is fixedly mounted to the engine/transmission assembly.

In accordance with an aspect of the present disclosure, the forward section and the rearward section have different gage thicknesses. The forward section is formed of a thinner gage than the rearward section.

In accordance with an aspect of the present disclosure, the front structure includes a right side rail extending longitudinally in the front portion of the vehicle on a right side of the engine/transmission assembly of the vehicle. The right side rail includes an inboard shell and an outboard shell. A forward section of the outboard shell of the right side rail is at least partially disposed in an outer right quarter of the total width of the vehicle. A rearward section of the outboard shell of the right side rail is disposed inboard of the outer right quarter. The inboard shell of the right side rail has a distal side, a top side, and a bottom side that form a generally U-shaped cross-section. The forward section of the outboard shell of the right side rail has a distal side, a top side, and a bottom side that form a generally U-shaped cross-section. The outboard shell of the right side rail is fixedly attached to the inboard shell of the right side rail to form a generally rectangular cross-section. The forward section of the outboard shell of the right side rail is a third lateral width. The rearward section of the outboard shell of the right side rail is a fourth lateral width that is less than the third lateral width.

In accordance with an aspect of the present disclosure, the forward section of the outboard shell of the right side rail includes a plurality of outer indentions that extend vertically along the distal side of the outboard shell of the right side rail. The forward section of the inboard shell of the right side rail includes a plurality of inner indentions that extend vertically along the distal side of the inboard shell of the right side rail to facilitate axial deformation of the right side rail.

In accordance with an aspect of the present disclosure, the plurality of outer indentions in the distal side of the outboard shell of the right side rail includes three indentions.

In accordance with an aspect of the present disclosure, the plurality of outer indentions in the distal side of the inboard shell of the right side rail includes two indentions.

In accordance with an aspect of the present disclosure, the front structure includes a crush can fixedly coupled to a forward terminal end of the right side rail and extending axially forward of the terminal end of the right side rail.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the inventions

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

The present disclosure relates to a vehicle having a front structure for narrow offset impacts. This vehicle front structure transfers some of the longitudinal forces into lateral movement of the vehicle away from the point of impact, as will be described below. While illustrated and described with reference to the left side of the vehicle, it is understood that the vehicle is constructed symmetrically with regards to the left and right sides of the front structure of the present disclosure.

Figure 1:
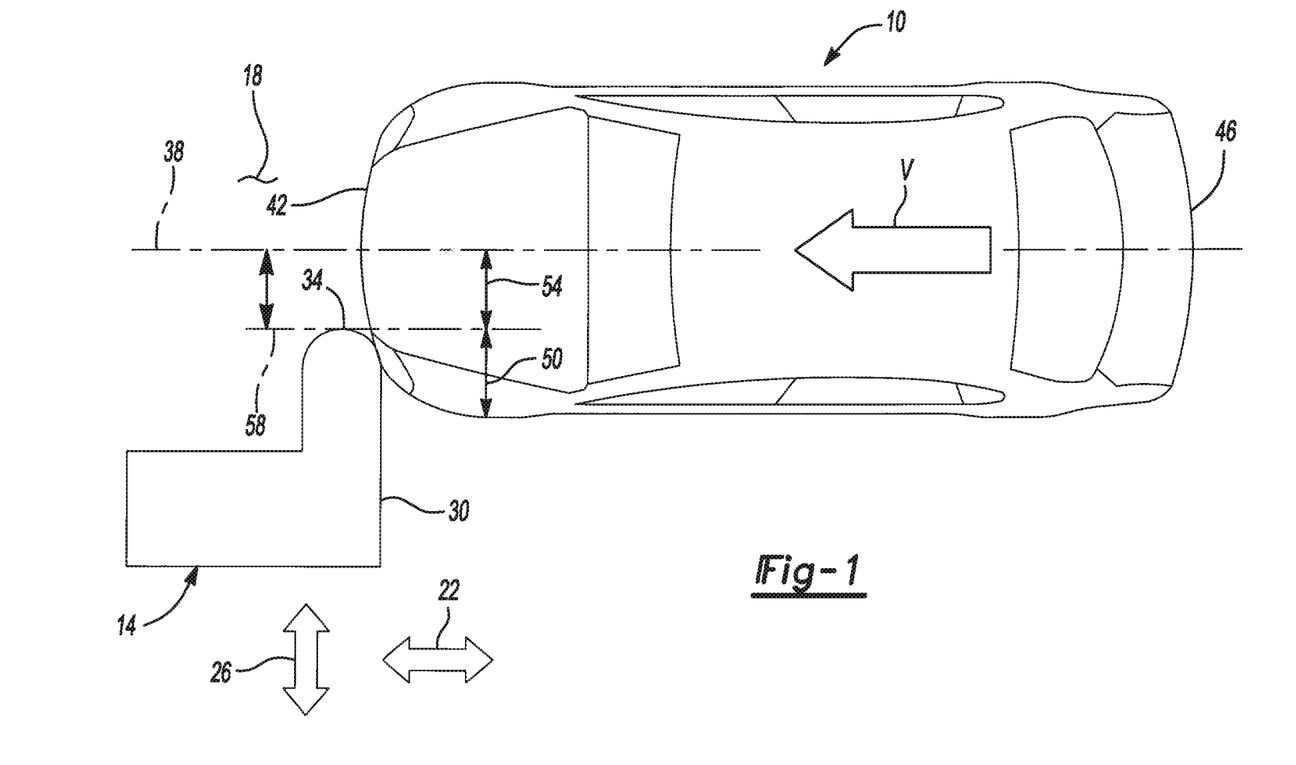
FIG. 1 is a top elevated view of an example of a vehicle and an impact body in accordance with the present disclosure.

With reference to FIG. 1, an example vehicle 10 is illustrated with an impact body, i.e., a barrier 14, positioned in accordance with the Insurance Institute for Highway Safety ("IIHS") narrow offset front impact testing. The barrier 14 is a rigid barrier such that the barrier 14 is fixed to the ground 18 to prevent movement of the barrier 14 in a longitudinal direction 22 or a lateral direction 26. The barrier 14 has an impacting face 30 and a generally rounded end 34. The vehicle 10 has a velocity V in the longitudinal direction 22 toward the barrier 14. In the example provided, the vehicle 10 has no velocity in the lateral direction 26 and the vehicle's 10 velocity V is perpendicular to the impact surface 30. In the example provided, the velocity V is 40 mph, though other speeds can be used. The vehicle 10 has a central axis 38 running longitudinally through the vehicle 10 from a front 42 to a rear 46 of the vehicle 10 and bisecting the vehicle 10. The barrier 14 is positioned to impact the vehicle 10 in an outer quarter 50, i.e., outer 25%, of the vehicle's 10 total lateral width. In the example provided, the outer quarter 50 is delineated from an inner quarter 54 by an offset axis 58 that is offset from the central axis 38 by 25% of the total lateral width of the vehicle 10. In other words, the vehicle 10 and barrier 14 are positioned such that when the vehicle 10 impacts the barrier 14, the end 34 generally aligns with the offset axis 58.

Figure 2:
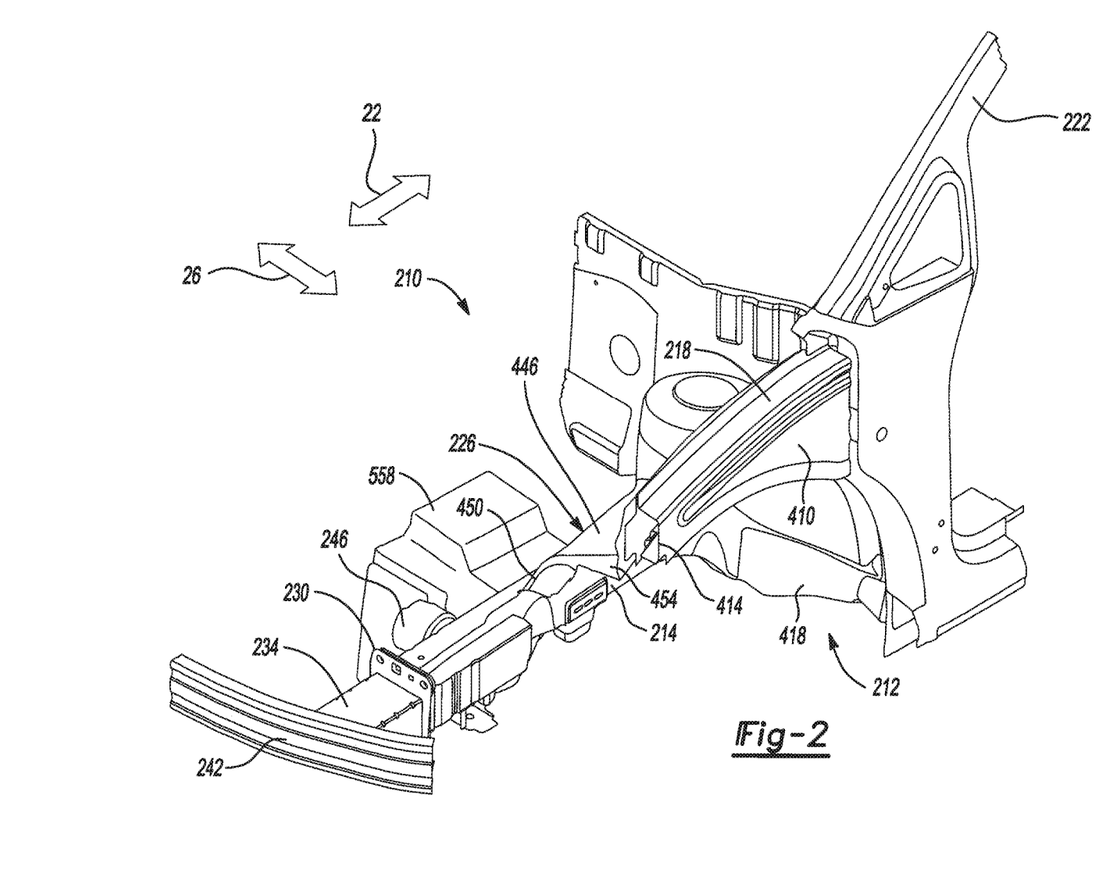
FIG. 2 is a perspective view of a front left portion of a front structure of the vehicle of FIG. 1.
Figure 3:
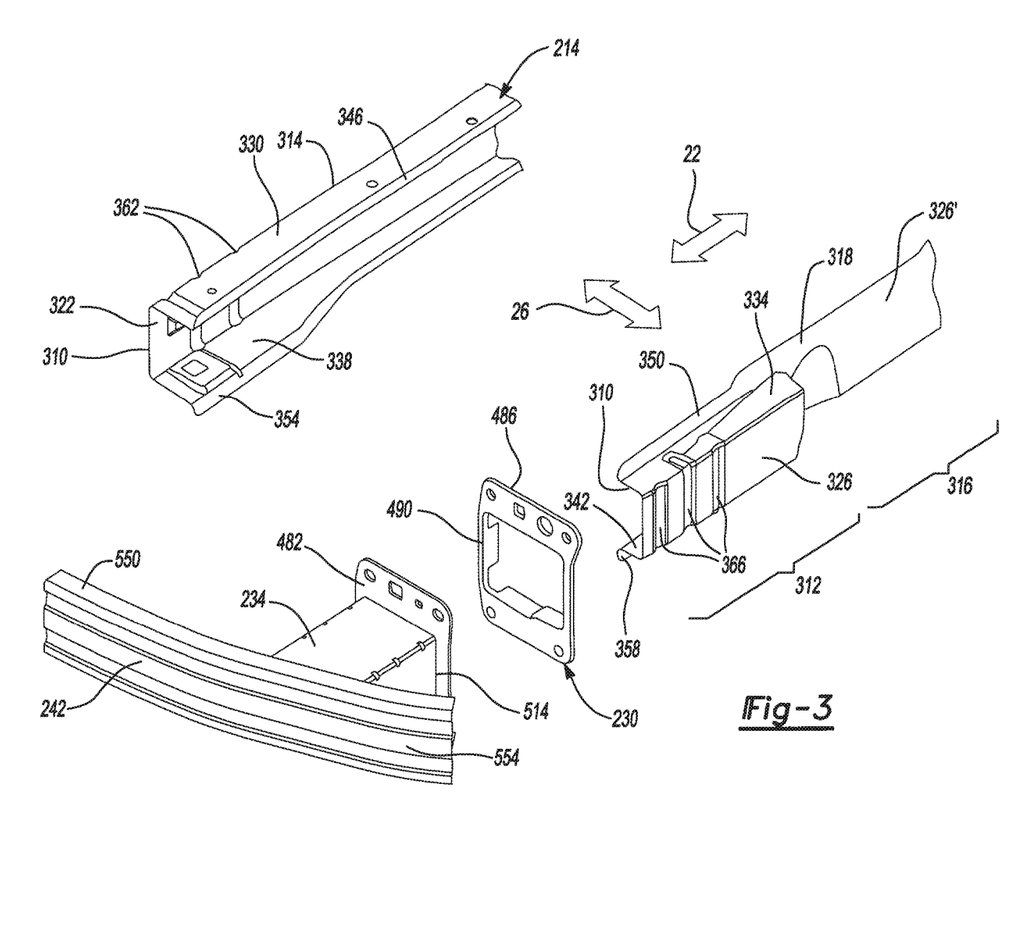
FIG. 3 is a partially exploded perspective view of a portion of the front left portion of FIG. 2.
Figure 4:
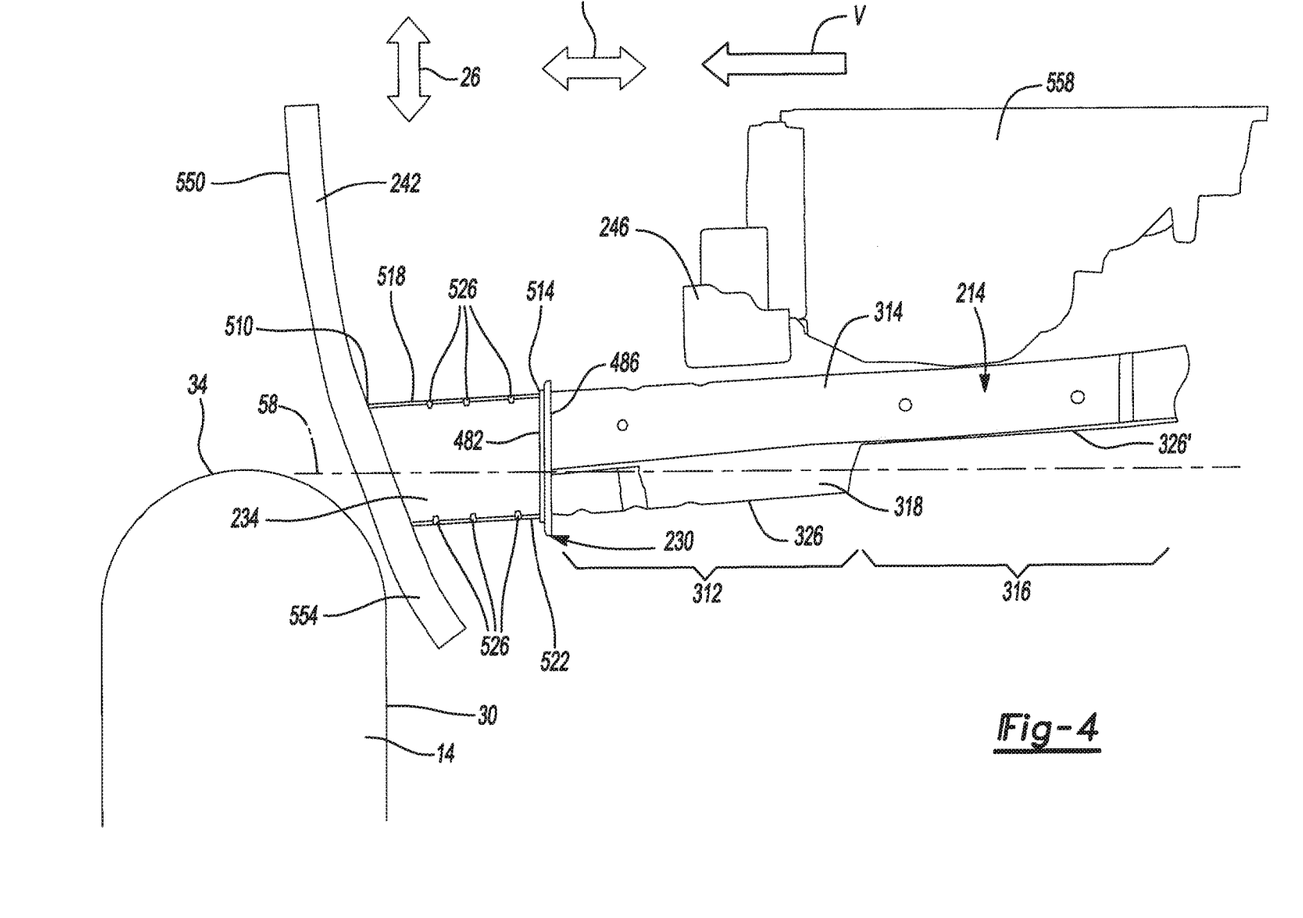
FIG. 4 is a top elevated view of the front left portion of the front structure of FIG. 2, illustrating the impact body of FIG. 1 in a pre-impact position.

With additional reference to FIGS. 2-4, a front left portion 210 of a vehicle front structure 212 is shown. In accordance with an aspect of the present disclosure, a vehicle such as vehicle 10 (FIG. 1) includes the front left portion 210. While only the front left portion 210 of the vehicle front structure 212 is illustrated, the front right portion (not shown) of the vehicle front structure 212 is similarly constructed. The front left portion 210 includes a side rail 214, a load beam 218, a pillar body 222, a support bracket 226, a front member 230, a crush can 234, a bumper 242, and a blocker body 246.

The side rail 214 has a front terminal end 310, proximate to the front 42 of the vehicle 10, and the side rail 214 extends in the longitudinal direction 22 from the terminal end 310 toward the rear 46 of the vehicle 10. The side rail 214 includes a forward section 312 and a rearward section 316. The side rail 214 includes an inner shell 314 and an outer shell 318 that extend within the forward and rearward section 312, 316 of the side rail 214. The inner shell 314 along the forward and rearward section 312, 316 and the outer shell 318 at least at the forward section 312 have generally "U" or hat-shaped cross-sections, with each having a distal side 322, 326 respectively, an upper side 330, 334 respectively, a lower side 338, 342 respectively, an upper flange 346, 350 respectively, and a lower flange 354, 358.

The upper and lower flanges 346, 350, 354, 358 generally form the "brim" of the hat-shaped cross-section, and run longitudinally along the side rail 214. The interiors of the U's, defined by the distal sides 322, 326 and the upper and lower sides 330, 334, 338, 342, face toward each other and the upper flanges 346, 350 and lower flanges 354, 358 are each welded to form a tubular structure. Thus, the distal side 322 forms an inner side of the tubular side rail 214 and the distal side 326 forms an outer side of the tubular side rail 214. In the example provided, the rearward section 316 of the outer shell 318 has a distal side 326' that is laterally offset from and entirely inboard of the distal side 326 of the forward section 312 of the outer shell 318. In the example provided, the shapes of the inner and outer shells 314, 318 are each formed by stamping a sheet of material, such as steel for example.

The shape of the side rail 214 is configured to facilitate a degree of controlled axial deformation under certain loads, such as full frontal impacts for example. In the example provided, the side rail 214 includes a plurality of indents 362, 366 on the forward sections 312 of the inner and outer shells 314, 318 to facilitate crumpling of the forward section 312 of the side rail 214. In the example provided, the forward section 312 of the inner shell 314 includes two indentions 362, and the forward section 312 of the outer shell 318 includes three indentions 366. The indentions 362, 366 extend vertically along the distal sides 322, 326.

The side rail 214 is offset from the central axis 38. In the example provided, the side rail 214 is offset from the central axis 38 such that the whole inner shell 314 and the rearward section 316 of the outer shell 318 are entirely inboard of the offset axis 58. In the example provided, the upper and lower flanges 346, 350, 354, 358 are generally aligned on the offset axis 58 at the terminal end 310. In the example provided, the upper and lower flanges 346, 350, 354, 358 are not parallel to the offset axis 58 and are angled inboard from the terminal end 310 as they extend longitudinally rearward, such that a portion of the upper side 334 of the outer shell 318 is laterally inboard of the offset axis 58 at the junction of the forward and rearward section 312, 316.

In the example provided, the wall thickness (i.e., the gage) of the side rail 214 is thinner at the forward sections 312 of the inner and outer shells 314, 318 than the rearward section 316.

The load beam 218 is generally offset from the side rail 214 and laterally outward from the offset axis 58. The load beam 218 has a main portion 410 and a front end or nose portion 414. The nose portion 414 is proximate to the front 42 of the vehicle 10. The main portion 410 extends generally longitudinally from the nose portion 414 toward the rear 46 of the vehicle 10 and upwardly along an arcuate path to join with the pillar body 222 and form a wheel well 418 for housing a front wheel (not shown). The pillar body 222 generally forms the "A" pillar of the vehicle 10.

The support bracket 226 is a stamped structure that has a generally "U" or hat-shaped cross-section. The support bracket 226 is overlapped by a stamped structure 446 to form a closed section. The support bracket 226 has an inner length 450 and an outer length 454. The inner length 450 is mounted (e.g. welded) to the rearward section 316 of the outer shell 318 of the side rail 214 and extends laterally outward and upward from the side rail 214. The outer length 454 extends laterally outward and upward from the inner length 450, such that the inner and outer lengths 450, 454 form an interior angle that opens toward the ground. The outer length 454 is mounted (e.g. welded) to the main portion 410 of the load beam 218. Thus, the support bracket 226 extends laterally between the side rail 214 and the load beam 218.

In an aspect, the front member 230 is a generally flat, piece or set of pieces. In the example provided, the front member 230 includes two, parallel flat plates that are mounted to each other (e.g., bolted or welded). It should be understood that the front member 230 can have other configurations. The front member 230 is transverse to the side rail 214. The front member 230 has a forward side 482 (i.e., on the forward one of the flat plates) that generally faces toward the front 42 of the vehicle 10, and a rearward side 486 (i.e., on the rearward one of the flat plates) that generally faces toward the rear 46 of the vehicle 10. In the example provided, the front member 230 defines an aperture 490 that penetrates through the front member 230 from the forward side 482 to the rearward side 486. The rearward side 486 is mounted (e.g. welded) to the terminal end 310 of the side rail 214. The aperture 490 generally aligns with the hollow tubular area of the side rail 214 formed by the interiors of the "U" shaped inner shell 314 and the forward section 312 of the outer shell 318.

The crush can 234 is a tubular body that has a generally rectangular cross-section. The crush can 234 has a forward end 510 and a rearward end 514. The rearward end 514 is mounted (e.g. welded) to the forward side 482 of the front member 230. The hollow interior (not specifically shown) of the tubular crush can 234 generally aligns with the aperture 490, such that the tubular body of the crush can 234 surrounds the aperture 490. Thus, the rearward section 316 of the outer shell 318 is laterally inboard of an outboard edge 522 of the crush can 234. The forward end 510 is angled relative to the rearward end 514, such that an inboard edge 518 of the forward end 510 extends further in the longitudinal direction 22 toward the front 42 of the vehicle 10 than the outboard edge 522 of the forward end 510. The crush can 234 has a shape that facilitates controlled crushing or crumpling under certain loads in the longitudinal direction 22. In the example provided, the crush can 234 also includes a plurality of notches 526 that are spaced longitudinally apart and penetrate through the corners of the crush can 234 to facilitate crumpling.

The bumper 242 is a tubular body that has a generally rectangular cross-section and is disposed generally across the front 42 of the vehicle 10. The bumper 242 has a central length 550 and an end length 554. The central length 550 extends generally in the lateral direction 26 across the front 42 of the vehicle 10 and in the example provided extends generally across the inner quarter 54 of the vehicle 10. The end length 554 curves or is angled relative to the central length 550 toward the rear 46 of the vehicle 10, and extends at least partially into the outer quarter 50 of the vehicle 10. In the example provided, the end length 554 is formed at a similar angle as the forward ends 510, 530 of the crush can 234. The bumper 242 is mounted (e.g. welded) to the forward end 510 of the crush can 234. In the example provided, the bumper 242 extends in the lateral direction 26 fully across the crush can 234 beyond the outer edge 522 of the crush can 234, though other configurations can be used.

The blacker body 246 is a rigid body disposed inboard of the side rail 214 and adjacent to the side rail 214 in close proximity thereto. The blacker body 246 is aligned in the longitudinal direction 22 with the forward section 312, i.e., the blocker body 246 is forward of the rearward section 316. In one construction, the blocker body 246 is fixedly mounted to the inboard side of the side rail 214 and laterally between the side rail 214 and an engine or transmission (collectively referred to as an engine/transmission assembly 558) of the vehicle. In another construction, the blocker body 246 is fixedly mounted to the engine/transmission assembly 558 or both the engine/transmission assembly 558 and the side rail 214 between the side rail 214 and the engine/transmission assembly 558. The blocker body 246 can be any suitable rigid body capable of transferring impact loads from the side rail 214 to the engine/transmission assembly 558 with minimal energy absorption. In the example provided, the blocker body 246 is an alternator mounted to the engine of the engine/transmission assembly 558.

With specific reference to FIG. 4, the portion of the front left portion 210 is illustrated in a pre-impact position with the vehicle moving with a velocity of V toward the barrier 14. With additional reference to FIG. 5, the front left portion 210 is illustrated after a first amount of time after impact with the barrier 14. Since only approximately half of the crush can 234 and forward section 312 of the side rail 214 are aligned to impact the barrier 14, and since the forward section 312 of the outer shell 318 is laterally outboard of the rearward section 316 of the outer shell 318, the side rail 214 does not primarily deform axially, though some axial crushing may occur. Instead, the side rail 214 primarily bends at the junction of the forward and rearward sections 312, 316, such that the terminal end 310 is moved laterally inboard of the rearward section 316.

Figure 5:
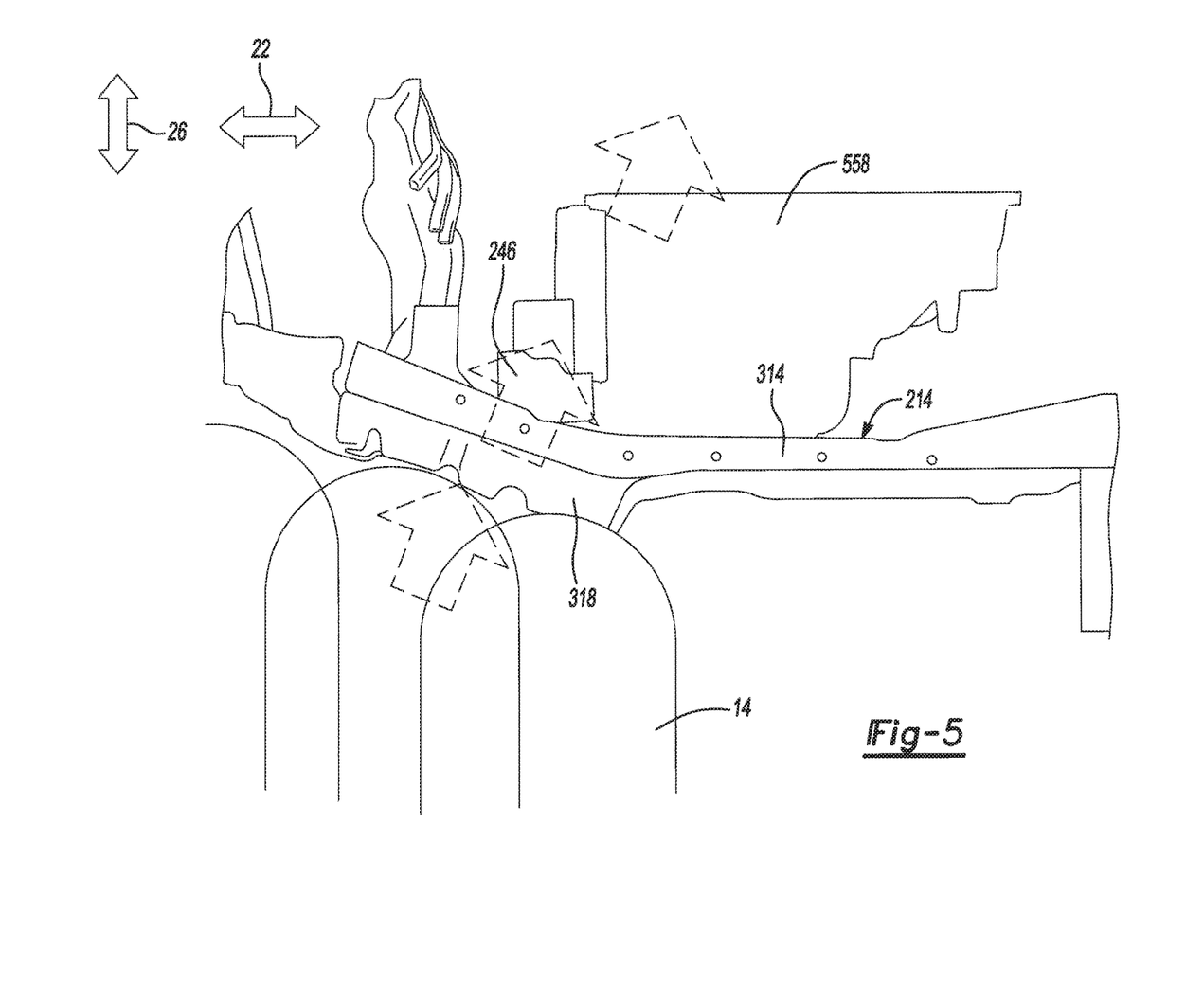
FIG. 5 is a top elevated view similar to FIG. 4, illustrating movement of the vehicle relative to the impact body following impact with the impact body.

As the forward section 312 of the side rail 214 bends inboard, it engages the blocker body 246 to transfer the impact forces laterally to the engine/transmission assembly 558. Since the engine/transmission assembly 558 is a significant mass of the vehicle 10, these lateral forces imparted into the engine/transmission assembly 558 cause the vehicle 10 to move in the lateral direction 26 away from the barrier 14. The controlled conversion of longitudinal velocity into lateral velocity helps facilitate moving the vehicle 10 away from the barrier 14 to minimize impact with the barrier 14. Furthermore, the engine/transmission assembly 558 will move laterally until it contacts the unstruck side rail (e.g., the right side rail, which can be otherwise similar to the left side rail 214 that is struck by the barrier 14 in the example provided). The contact between the engine/transmission assembly 558 and the unstruck side rail can transmit some of the impact energy into the structure of the unstruck side rail to distribute and dissipate some of the impact energy thereto and away from the struck side rail 214 and the passenger compartment. In doing so, the load experienced by the struck side rail 214 is reduced and transferred to the unstruck side rail. Some of the load transferred to the unstruck side rail is dispersed by deformation of the unstruck side rail.

Thus, the side rail 214 of the present disclosure improves small off-set impact performance in a simple and cost effective manner.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A front structure of a vehicle, the front structure comprising:
a left side rail extending longitudinally in a front portion of the vehicle on a left side of an engine/transmission assembly of the vehicle, the left side rail including an inboard shell and an outboard shell, a forward section of the outboard shell being at least partially disposed in an outer left quarter of a total width of the vehicle, a rearward section of the outboard shell being disposed inboard of the outer left quarter, the inboard shell having a distal side, a top side, and a bottom side that form a generally U-shaped cross-section, the forward section of the outboard shell having a distal side, a top side, and a bottom side that form a generally U-shaped cross-section, the outboard shell being fixedly attached to the inboard shell to form a generally rectangular cross-section, the forward section of the outboard shell being a first lateral width, the rearward section of the outboard shell being a second lateral width that is less than the first lateral width.

2. The front structure of claim 1, wherein the forward section of the outboard shell includes a plurality of outer indentions that extend vertically along the distal side of the outboard shell, and the forward section of the inboard shell includes a plurality of inner indentions that extend vertically along the distal side of the inboard shell to facilitate axial deformation of the left side rail.

3. The front structure of claim 2, wherein the plurality of outer indentions in the distal side of the outboard shell includes three indentions.

4. The front structure of claim 3, wherein the plurality of inner indentions in the distal side of the inboard shell includes two indentions.

5. The front structure of claim 1, further comprising a crush can fixedly coupled to a forward terminal end of the left side rail and extending axially forward of the terminal end.

6. The front structure of claim 1, further comprising a blacker body, the blocker body being a rigid body disposed between the left side rail and the engine/transmission assembly of the vehicle, the blocker body being forward of the rearward section and configured to engage the forward section and the engine/transmission assembly to transfer lateral impact forces from the forward section to the engine/transmission assembly during a narrow offset impact event.

7. The front structure of claim 6, wherein the blocker body is an alternator fixedly mounted to the engine/transmission assembly.

8. The front structure of claim 6, wherein the blocker body is fixedly mounted to the left side rail.

9. The front structure of claim 6, wherein the blocker body is fixedly mounted to the engine/transmission assembly.

10. The front structure of claim 1, wherein the forward section and the rearward section have different gage thicknesses, the forward section being formed of a thinner gage than the rearward section.

11. The front structure of claim 1, further comprising a right side rail extending longitudinally in the front portion of the vehicle on a right side of the engine/transmission assembly of the vehicle, the right side rail including an inboard shell and an outboard shell, a forward section of the outboard shell of the right side rail being at least partially disposed in an outer right quarter of the total width of the vehicle, a rearward section of the outboard shell of the right side rail being disposed inboard of the outer right quarter, the inboard shell of the right side rail having a distal side, a top side, and a bottom side that form a generally U-shaped cross-section, the forward section of the outboard shell of the right side rail having a distal side, a top side, and a bottom side that form a generally U-shaped cross-section, the outboard shell of the right side rail being fixedly attached to the inboard shell of the right side rail to form a generally rectangular cross-section, the forward section of the outboard shell of the right side rail being a third lateral width, the rearward section of the outboard shell of the right side rail being a fourth lateral width that is less than the third lateral width.

12. The front structure of claim 11, wherein the forward section of the outboard shell of the right side rail includes a plurality of outer indentions that extend vertically along the distal side of the outboard shell of the right side rail, and the forward section of the inboard shell of the right side rail includes a plurality of inner indentions that extend vertically along the distal side of the inboard shell of the right side rail to facilitate axial deformation of the right side rail.

13. The front structure of claim 12, wherein the plurality of outer indentions in the distal side of the outboard shell of the right side rail includes three indentions.

14. The front structure of claim 13, wherein the plurality of outer indentions in the distal side of the inboard shell of the right side rail includes two indentions.

15. The front structure of claim 11, further comprising a crush can fixedly coupled to a forward terminal end of the right side rail and extending axially forward of the terminal end of the right side rail.

* * * * *